(12) United States Patent
Whitehill et al.

(10) Patent No.: US 6,937,602 B2
(45) Date of Patent: Aug. 30, 2005

(54) SYSTEM AND METHOD FOR PROVIDING A CONGESTION OPTIMIZED ADDRESS RESOLUTION PROTOCOL FOR WIRELESS AD-HOC NETWORKS

(75) Inventors: Eric A. Whitehill, Fort Wayne, IN (US); Michael A. Ruckstuhl, Orlando, FL (US); Charles R. Barker, Jr., Orlando, FL (US)

(73) Assignee: MeshNetworks, Inc., Maitland, FL (US)

(*) Notice: Subject to any disclaimer, the term of this patent is extended or adjusted under 35 U.S.C. 154(b) by 20 days.

(21) Appl. No.: 10/277,800

(22) Filed: Oct. 23, 2002

(65) Prior Publication Data

US 2003/0076837 A1 Apr. 24, 2003

Related U.S. Application Data

(63) Continuation-in-part of application No. 10/253,646, filed on Sep. 25, 2002, now Pat. No. 6,771,666, and a continuation-in-part of application No. 09/983,176, filed on Oct. 23, 2001
(60) Provisional application No. 60/364,023, filed on Mar. 15, 2002, and provisional application No. 60/357,645, filed on Feb. 20, 2002.

(51) Int. Cl.[7] ............................ H04L 12/28; H04L 12/56
(52) U.S. Cl. .................. 370/395.54; 370/338; 370/401
(58) Field of Search ................... 370/395.4, 395.54, 370/352, 338, 312, 328, 329, 337, 345, 347, 229, 230, 400, 401, 442, 465, 475, 432, 474, 390, 389, 392

(56) References Cited

U.S. PATENT DOCUMENTS

| | | | |
|---|---|---|---|
| 4,494,192 A | 1/1985 | Lew et al. | 710/112 |
| 4,617,656 A | 10/1986 | Kobayashi et al. | 370/445 |
| 4,736,371 A | 4/1988 | Tejima et al. | 370/236 |

(Continued)

FOREIGN PATENT DOCUMENTS

| | | |
|---|---|---|
| CA | 2132180 | 3/1996 |
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "Soft Handoffs in CDMA Mobile Systems", Dec. 1997, IEEE Personal Communications.

(Continued)

*Primary Examiner*—Brian Nguyen
(74) *Attorney, Agent, or Firm*—Gardner Carton & Douglas, LLP; Joseph J. Buczynski

(57) ABSTRACT

A system and method for providing a congestion optimized address resolution protocol (ARP) for a wireless ad-hoc network. The system and method enables a node in the wireless ad-hoc network to issue an ARP request without the need to broadcast the request to all of the nodes in the wireless ad-hoc network, to thus minimize radio traffic on the wireless ad-hoc network for handling the ARP request. The node includes an address resolution protocol module which is adapted to generate an ARP request for a media access control (MAC) address corresponding to an Internet protocol (IP) address, and a transceiver which is adapted to transmit the ARP request for delivery to a broadcast server without broadcasting the ARP request to a plurality of other nodes in the wireless ad-hoc network.

20 Claims, 3 Drawing Sheets

U.S. PATENT DOCUMENTS

| | | | |
|---|---|---|---|
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/348 |
| 5,233,604 A | 8/1993 | Ahmadi et al. | 370/238 |
| 5,241,542 A | 8/1993 | Natarajan et al. | 370/311 |
| 5,317,566 A | 5/1994 | Joshi | 370/238 |
| 5,392,450 A | 2/1995 | Nossen | 455/12.1 |
| 5,412,654 A | 5/1995 | Perkins | 370/312 |
| 5,424,747 A | 6/1995 | Chazelas et al. | 342/70 |
| 5,502,722 A | 3/1996 | Fulghum | 370/343 |
| 5,517,491 A | 5/1996 | Nanni et al. | 370/252 |
| 5,555,425 A | 9/1996 | Zeller et al. | 710/110 |
| 5,555,540 A | 9/1996 | Radke | 370/462 |
| 5,572,528 A | 11/1996 | Shuen | 370/402 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/346 |
| 5,623,495 A | 4/1997 | Eng et al. | 370/397 |
| 5,627,976 A | 5/1997 | McFarland et al. | 710/309 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 709/228 |
| 5,701,294 A | 12/1997 | Ward et al. | 370/252 |
| 5,706,428 A | 1/1998 | Boer et al. | 370/342 |
| 5,717,689 A | 2/1998 | Ayanoglu | 370/349 |
| 5,745,483 A | 4/1998 | Nakagawa et al. | 370/335 |
| 5,774,876 A | 6/1998 | Woolley et al. | 705/28 |
| 5,781,540 A | 7/1998 | Malcolm et al. | 370/321 |
| 5,787,080 A | 7/1998 | Hulyalkar et al. | 370/310.2 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 710/313 |
| 5,805,977 A | 9/1998 | Hill et al. | 340/7.22 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 710/117 |
| 5,857,084 A | 1/1999 | Klein | 710/305 |
| 5,870,350 A | 2/1999 | Bertin et al. | 365/233 |
| 5,877,724 A | 3/1999 | Davis | 342/357.1 |
| 5,881,095 A | 3/1999 | Cadd | 375/132 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.11 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/306 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/311 |
| 6,130,881 A | 10/2000 | Stiller et al. | 370/238 |
| 6,130,892 A | 10/2000 | Short et al. | 370/401 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | van Bokhorst et al. | 455/343.3 |
| 6,208,870 B1 | 3/2001 | Lorello et al. | 455/466 |
| 6,223,240 B1 | 4/2001 | Odenwald et al. | 710/311 |
| 6,240,294 B1 | 5/2001 | Hamilton et al. | 455/456.3 |
| 6,246,875 B1 | 6/2001 | Seazholtz et al. | 455/432.1 |
| 6,249,516 B1 | 6/2001 | Brownrigg et al. | 370/338 |
| 6,275,707 B1 | 8/2001 | Reed et al. | 455/456.3 |
| 6,285,892 B1 | 9/2001 | Hulyalkar | 455/574 |
| 6,304,556 B1 | 10/2001 | Haas | 370/254 |
| 6,307,843 B1 * | 10/2001 | Okanoue | 370/312 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 2001/0005368 A1 * | 6/2001 | Rune | 370/390 |
| 2001/0024443 A1 * | 9/2001 | Alriksson et al. | 370/401 |
| 2001/0053699 A1 | 12/2001 | McCrady et al. | 455/513 |
| 2002/0013856 A1 * | 1/2002 | Garcia-Luna-Aceves et al. | 709/238 |
| 2002/0044549 A1 * | 4/2002 | Johansson et al. | 370/386 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliot and Bob Heile, "Self–Organizing, Sef–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link–State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustments".

Ram Ramanathan and Martha E. Steenstrup, "Hierarchically–Organized, Multihop Mobile Wireless Networks for Quality–of–Service Support".

Zhenyu Tang and J.J. Garcia–Luna–Aceves, "Collision–Avoidance Transmission Scheduling for Ad–Hoc Networks".

George Vardakas and Wendell Kishaba, "QoS Networking With Adaptive Link Control and Tactical Multi–Channel Software Radios".

* cited by examiner

SYSTEM AND METHOD FOR PROVIDING A CONGESTION OPTIMIZED ADDRESS RESOLUTION PROTOCOL FOR WIRELESS AD-HOC NETWORKS

This application claims benefit under 35 U.S.C. §119(e) from a U.S. Provisional Patent Application of Charles R. Barker, Jr. entitled "A System and Method for Trans-Medium Address Resolution on an Ad-Hoc Network with at Least One Highly Disconnected Medium Having Multiple Access Points to Other Media", Ser. No. 60/364,023, filed Mar. 15, 2002, and a U.S. Provisional Patent Application of Whitehill et al., entitled "A System and Method for Providing a Congestion Optimized Address Resolution Protocol for Wireless Ad-Hoc Networks", Ser. No. 60/357,645, filed Feb. 20, 2002, and is a continuation-in-part of U.S. Patent Application of Charles R. Barker, Jr. entitled "A System and Method for Trans-Medium Address Resolution on an Ad-Hoc Network with at Least One Highly Disconnected Medium Having Multiple Access Points to Other Media", Ser. No. 10/253,646, filed Sep. 25, 2002 now U.S. Pat. No. 6,771,666 and U.S. Patent Application of Barker et al., entitled "A System and Method for Providing a Congestion Optimized Address Resolution Protocol for Wireless Ad-Hoc Networks", Ser. No. 09/983,176, filed on Oct. 23, 2001, the entire contents of each of these provisional and nonprovisional applications being incorporated herein by reference.

BACKGROUND OF THE INVENTION

1. Field of the Invention

The present invention relates to a system and method for providing a congestion optimized address resolution protocol for wireless ad-hoc networks. More particularly, the present invention relates to a system and method for providing a congestion optimized address resolution protocol for wireless ad-hoc networks without a wireline interface. The present invention also relates to a system and method for enabling a node on a wireless ad-hoc network to issue an address resolution protocol request without the need to broadcast the request to a plurality of other nodes on the wireless ad-hoc network, to thus minimize the amount of traffic on the network necessary to handle the request. The present invention further relates to a system and method for data routing in an ad-hoc network where optimum mobile node-to-IAP links are constantly changing, and more particularly, to a system and method for modifying an address resolution protocol (ARP) mechanism to assign a unique media access control (MAC) address for mobile node's IAP, such that frames addressed with this unique MAC address are routed by medium-layer routing protocols to the node's associated IAP at the time the frame is sent.

2. Description of the Related Art

In recent years, a type of mobile communications network known as an "ad-hoc" network has been developed for use by the military. In this type of network, each user terminal is capable of operating as a base station or router for the other user terminals, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling user terminals to communicate with each other as in a conventional ad-hoc network, further enable user terminals, also referred to as subscriber devices, to access a fixed network and thus communicate with other user terminals, such as those on the public switched telephone network (PSTN), and on other networks such as a local area network (LAN) and the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

Address Resolution Protocol (ARP) is a protocol for mapping an Internet Protocol address (IP address) to a physical machine address that is recognized in a local network, such as a LAN. For example, in IP Version 4, which is the most common level of IP in use today, an address is 32 bits long. In an Ethernet local area network, however, addresses for attached devices are 48 bits long. The physical machine address is also commonly referred to as a Media Access Control or MAC address. A table, usually called the ARP cache, is used to maintain a correlation between each MAC address and its corresponding IP address. ARP provides the protocol rules for making this correlation and providing address conversion in both directions, that is, from IP address to MAC address and vice-versa.

ARP functions in the following manner. When an incoming packet destined for a host machine on a particular LAN arrives at a gateway on the LAN, the gateway requests that the ARP program find a physical host or MAC address that matches the IP address. The ARP program looks in the ARP cache at the gateway and, if it finds the MAC address, provides the MAC address so that the packet can be converted and formatted as appropriate and sent to the machine. If no entry is found for the IP address in the ARP cache, the ARP program broadcasts a request packet in a special format to all the machines on the LAN to see if any machine recognizes that IP address as being associated with its MAC address. A machine that recognizes the IP address as its own returns an affirmative reply to the ARP program. A machine configured to respond to requests for an IP addresses other than its own, for which it is said to proxy, returns an affirmative reply if it recognizes the IP address as one for which it is so configured. In response, the ARP program updates the ARP cache for future reference, and then sends the packet to the machine having the MAC address associated with the IP address for which the packet is intended. Examples of conventional ARP techniques performed in asynchronous transfer mode (ATM) networks employing LANs are described in a publication by M. Laubach and J Halpern entitled "Classical IP and ARP over ATM", IETF RFC 2225, April, 1998, in a publication by Jill Kaufman entitled "ATM Forum Education Corner", ATM Forum, 2001, and in a publication by Rajeev Gupta entitled "The 'Glue' of Networks: Looking at IP over ATM", ATM Forum, 2001, the entire contents of each of these documents is incorporated herein by reference.

Although the process described above is suitable for use with wired networks and broadcast wireless, the process is not suitable for use in an ad-hoc wireless network. Specifically, in an ad-hoc wireless network, when the ARP of a node causes a broadcast of the ARP request packet to all the nodes on the wireless network, such a broadcast could flood the radio network since it would be required to be repeated by every node to ensure completeness.

The MANET working group within the IETF is evaluating techniques in which to accomplish the delivery of such broadcast messages from a node in a wireless LAN. For example, the message can be via a broadcast of the IP address to all nodes on the network, or via a single hop broadcast to only neighboring nodes. In the case in which the message is broadcast to all nodes on the network, the amount of radio traffic generated on the network is enormous because each node must insure that its neighbors receive the message. Although certain techniques can be used to reduce this overhead, there is no mechanism for delivering a broadcast message toward a destination capable of resolving the ARP. Alternatively, in the single hop case, a node which is not directly connected to a node which can resolve the ARP request will never receive a reply. In addition, in either case, the reliability of the broadcast transfer can be severely impacted by the hidden terminal problem common in ad-hoc networks, as well as the near/far problem in which a node near to a node receiving a signal from a more distant node inadvertently transmits to the near node and thus destroys the ongoing reception from the distant node. A hidden terminal is a node which is out of range of a transmitting node and can therefore destroy an ongoing reception. This effect is particularly detrimental to broadcast transmissions which do not require a clear-to-send operation by the receiving node. Without the clear to send, the hidden terminal has no knowledge that a transmission is occurring and is free to attempt a transmission. An example of a non-broadcast multi-access subnetwork (NBMA) is described in a publication by J. Luciani et al. entitled "NBMA Next Hop Resolution Protocol (NHRP)", IETF RFC 2332, April 1998, the entire contents of which is incorporated herein by reference.

Accordingly, a need exists for a system and method for improving the manner in which ARP is performed on wireless ad-hoc networks.

Furthermore, generally all of the nodes in a wireless ad-hoc peer-to-peer network provide certain similar core services and functionality, although they can each provide different functions relating to their specific purpose and application (e.g. if they are an access point, wireless router, and so on). Therefore peer-to-peer networks distinguish themselves from infrastructure networks where one or more nodes offer a superset of the functionality of the rest of the network. Infrastructure nodes in these networks typically can handle Dynamic Host Configuration Protocol (DHCP), Address Resolution Protocol (ARP), as well as other services that depend on broadcast traffic. DHCP is defined by IETF RFC 2131 and 2132, which are incorporated herein by reference, and is used by a client node to automatically obtain network settings from a central server. These network settings include the client's IP address, the address of Domain Name Servers (DNS), the IP address of default gateways, and many other network settings. Address resolution protocol is defined by STD 0037 and RFC 0826, which are incorporated herein by reference, and is used by a network node to map IP addresses to MAC addresses so IP traffic can be delivered to specific hardware.

These infrastructure nodes are normally discovered by broadcast traffic advertisements from their client nodes in a network, however peer-to-peer networks typically do not contain specialized infrastructure nodes. The IEEE 802.11 standard offers a peer-to-peer mode in addition to an infrastructure mode. Details of the 802.11 standards are set forth in ISO/IEC 8802-11, ANSI/IEEE 802.11 "Information Technology—Telecommunications and Information Exchange Between Systems—Local and Metropolitan Area Network Specific Requirements", Part 11: Wireless Medium Access Control (MAC) and Physical Layer (PHY) Specifications, the entire contents of which being incorporated herein by reference. Also, a description of the 802.11 standard is found in a book by Bob O'Hara and Al Petrick entitled *IEEE 802.11 Handbook: A Designer's Companion,* IEEE, 1999, the entire contents of which being incorporated herein by reference.

These packet-switched networks can operate across many different kinds of physical hardware by using network-layer routers, such as Internet protocol (IP) routers, with multiple hardware interfaces at junctions where the different hardware mediums must communicate. In the case of fully connected multiple-access hardware mediums, such as CSMA-CD LAN's, where all nodes can directly communicate to all other nodes via hardware broadcasts, media converters can also be inserted into the network to operate below the network layer and pass hardware frames between two different mediums, such as with a 10base2-to-10baseT media converter. In this manner, a media converter can allow a single network-layer routing domain to span multiple hardware media.

However, in an ad-hoc networking system, all routing is done below the network layer since frames in the unified network layer sub-net may be intended for nodes within either the media, wired or wireless network. Therefore, routing methods must be adapted to cross any media junctures below the network layer. However, a media converter would not fit the need because the wireless medium is highly disconnected. That is, nodes in the wireless network may not hear frames from other nodes that are geographically or electrically distant, or occupy different data channels at the time of transmission. In certain ad-hoc networks, intelligent access points (IAP's) are connected to bridge the wired and wireless media, as network efficiency dictates that there be many diverse access points to the wired network. Details of these requirements are described in U.S. patent application Ser. Nos. 09/897,790, 09/815,157 and 09/815,164, referenced above.

Because the wireless network is not fully connected, the IAP's act as proxies rather than as media converters. Whereas a LAN media converter would hear all frames from all nodes on one medium and directly replicate them on the opposing medium, frames that must cross from the wireless medium to the wired medium in an ad-hoc network are medium-addressed directly to an access point below the network layer to ensure delivery, since the source of the frame may not be within direct transmission range of an access point. In such cases, broadcast services and address resolution protocol (ARP) are handled through special tunneling mechanisms, such as address resolution protocol. Unicast frames that must cross the media carry unicast addressing, particular to the given medium, that specifies a particular IAP.

As noted, address resolution within the ad-hoc network is difficult due to the replacement of traditional LAN components with a wireless network. Whereas in a LAN, ARP may broadcast a request packet for unknown addresses with little impact, in a wireless network such broadcasts could flood the radio network. As disclosed in U.S. Provisional Patent Application Ser. No. 60/357,645 to Whitehill et al. referenced above, modifications to the use of ARP satisfies the broadcast concerns of address resolution issues within ad-hoc networks, however the mobility of nodes in the network results in a need for yet further modifications.

Node mobility poses additional problems for traditional ARP uses, as address resolutions made by ARP are generally cached. Cached address resolutions work well for wired-to-wired or wireless-to-wireless unicast communications, as it reduces the need to resolve every network packet individually. Network addresses are resolved to medium addresses once, then cached for future network packets. In a typical implementation, this cache may have an expiration timeout on the order of 20–120 minutes. Upon timeout, a given network address will be re-resolved to ensure reliable resolution for situations where network addresses of given nodes change periodically, such as the case with a DHCP-managed network. When a wireless node resolves network addresses of devices on the wired medium, a medium address is determined that correlates to the node's associated IAP and which is presumed to be the "best" media bridge for the node to use. The best IAP may be selected based on bandwidth, spectral efficiency, or other reasons specific to the network. To provide this functionality, the ARP mechanism is implemented in such a way as to offer the medium address of a node's associated IAP when resolving network addresses of wired nodes. However, given node mobility, the best IAP may not be static for a given mobile node. In such a network, IAP associations may be formed and broken at a higher rate than the ARP expiration timeout would correct for. While the wireless network might allow routing to less-appropriate IAP's, the network would not operate very efficiently. Furthermore, security issues might not allow a non-associated IAP to proxy for a given wireless node.

Accordingly, in addition to an existing need for a system and method for improving the manner in which ARP is performed on wireless ad-hoc networks, a need exists for a system and method for modifying the ARP mechanism to assign a medium address for a mobile node's associated IAP in which the optimum IAP is targeted.

SUMMARY OF THE INVENTION

An object of the present invention is to provide a system and method for providing a congestion optimized ARP for a wireless ad-hoc network.

Another object of the present invention is to provide a system and method for enabling a node in a wireless ad-hoc network to issue an ARP request without the need to broadcast the request to all of the nodes on the wireless ad-hoc network.

A further object of the present invention is to provide a system and method for enabling a node on a wireless ad-hoc network to issue an ARP request and receive a response to the ARP request with minimal traffic on the network.

Another object of the present invention is to provide a system and method for providing a congestion optimized address resolution protocol for wireless ad-hoc networks without a wireline interface.

Still another object of the present invention is to provide a mechanism for trans-medium address resolution on a network with at least one highly disconnected medium having multiple access points to other media.

A further object of the present invention is to provide a system and method for modifying the ARP mechanism to assign a medium address for a mobile node's associated IAP which directs medium-layer routing protocols to route medium frames so addressed to the node's associated IAP at the time the frame is sent.

These and other objects are substantially achieved by providing a system and method for providing a congestion optimized address resolution protocol (ARP) for a wireless ad-hoc network. The system and method enables a node in a wireless ad-hoc network to issue an ARP request without the need to broadcast the request to all of the nodes in the wireless ad-hoc network, to thus minimize radio traffic on the wireless ad-hoc network for handling the ARP request. The node includes an address resolution protocol module which is adapted to generate an ARP request for a media access control (MAC) address corresponding to an Internet protocol (IP) address, and a transceiver which is adapted to transmit the ARP request for delivery to an access point of a network portion, such as a core LAN of the network, without broadcasting the ARP request to a plurality of other nodes in the wireless ad-hoc network. The transceiver can transmit the ARP request to the access point directly or via other nodes in the wireless ad-hoc network. Alternatively, the transceiver can transmit the ARP request to one or more broadcast servers which are dispersed in the network and operate similar to an access point without the use of a wireline backbone.

These and other objects are further substantially achieved by providing a system and method for identifying optimum IAP addresses which are subject to change at rates greater than traditional address updating may provide for. Once identified, the system and method provides a "unique" media access control (MAC) address in address resolution protocol (ARP) when wireless nodes are communicating with nodes on a core LAN. Medium layer routing protocols recognize that medium frames addressed with this unique address should be routed to the node's currently associated IAP, whichever IAP that might be at the moment the frame is sent.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
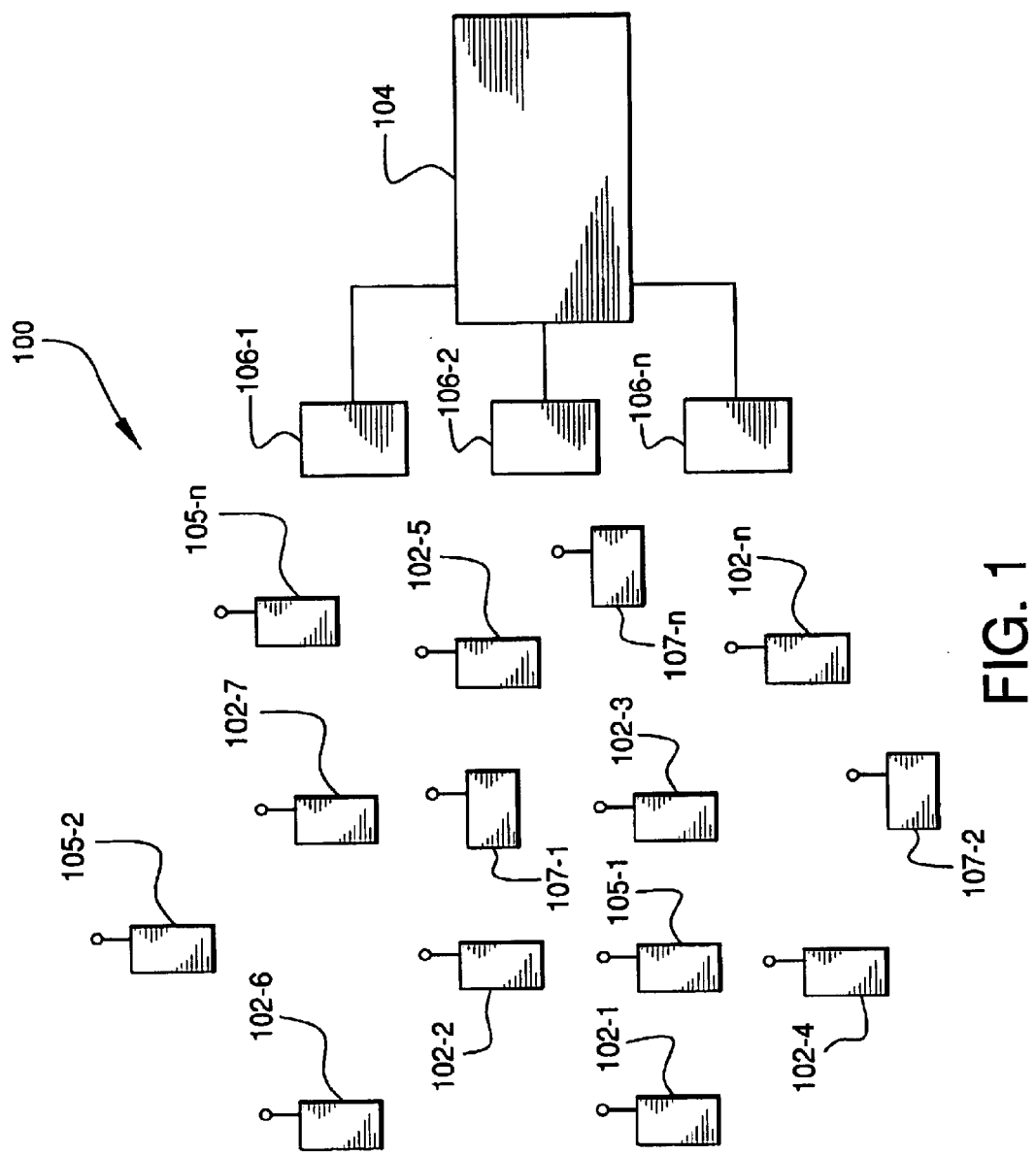
FIG. 1 is a block diagram of an example of an ad-hoc packet-switched wireless communications network employing a system and method for providing a congestion optimized ARP according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless subscriber devices 102-1 through 102-n (referred to generally as subscriber devices, nodes or mobile nodes 102), and a fixed network 104 having a plurality of access points 106-1, 106-2, . . . , 106-n, for providing the subscriber devices 102 with access to the fixed network 104. The fixed network 104 includes, for example, a core local access network (LAN), and a plurality of servers and gateway routers, to thus provide the subscriber devices 102 with access to other networks, such as the public switched telephone network (PSTN), the Internet or another wireless ad-hoc network. The network 100 also includes one or more fixed routers 105-1 through 105-n (referred to generally as fixed routers 105) for routing data packets between nodes 102, nodes 102 and access points 106, and other routers 105. The network 100 optionally further includes one or more broadcast servers 107-1 through 107-n (referred to generally as broadcast servers 107), the purposes of which are described in detail below.

Figure 2:
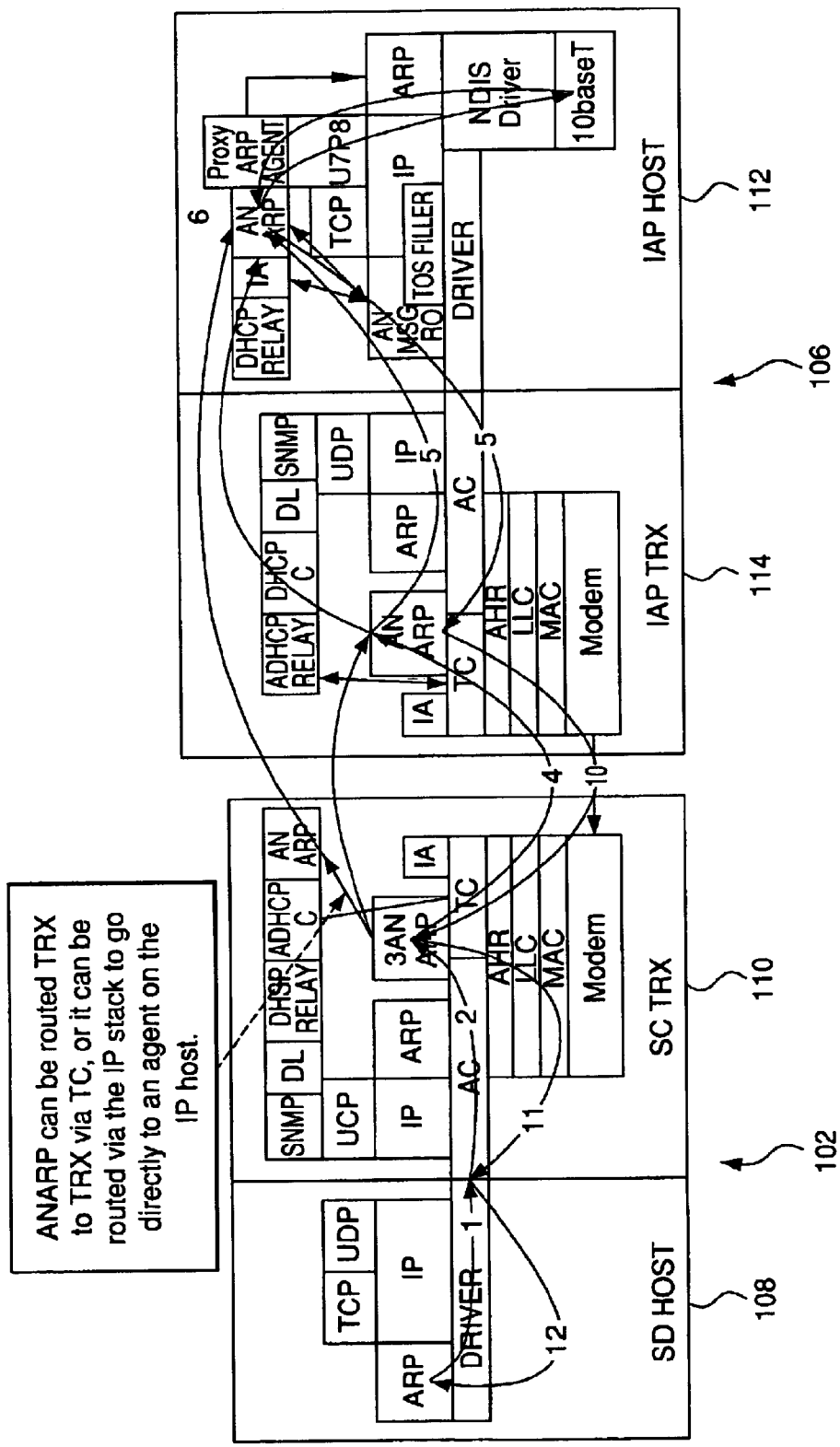
FIG. 2 is a conceptual block diagram illustrating an example of communication exchanges between a subscriber device and an intelligent access point on the network shown in FIG. 1 when performing an ARP according to an embodiment of the present invention.
Figure 3:
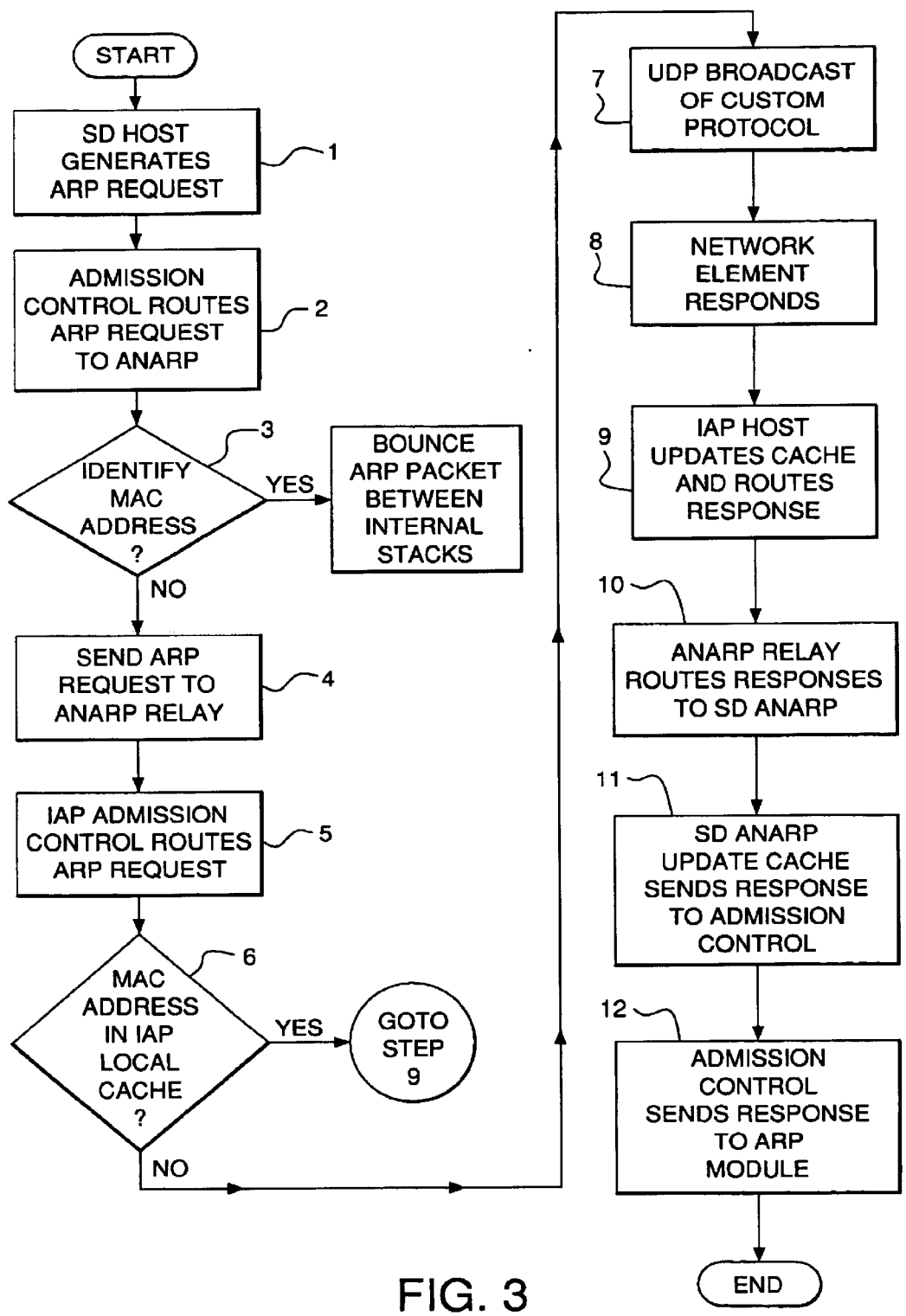
FIG. 3 is a flowchart showing an example of operations performed by the subscriber device and intelligent access point as shown in FIG. 2.

The subscriber devices 102 are capable of communicating with each other directly, or via one or more other subscriber devices 102 operating as a router or routers for data packets being sent between subscriber devices 102, as described in U.S. Pat. No. 5,943,322 to Mayor and in U.S. patent application Ser. Nos. 09/897,790 and 09/815,157, referenced above. As shown in FIGS. 2 and 3, each subscriber device 102 includes a subscriber device host 108 which can be, for example, a notebook computer terminal, mobile telephone unit, mobile data unit, or any other suitable device. Each subscriber device 102 further include a transceiver 110 that is capable of receiving and transmitting signals, such as packetized data signals, to and from the subscriber device 102, via a modem as, for example, a radio frequency (RF) transmission under the control of a controller (not shown). The packetized data signals can include, for example, voice, data or multimedia. Each subscriber device 102 further includes a memory (not shown) including a read only memory (ROM) for storing information pertaining to the operation of the node, and a random access memory (RAM) for storing information such as routing table information and the like, in accordance with data packets transmitted, received and routed by the transceiver 110. Further details of these types of ad-hoc networks are described in U.S. patent application Ser. No. 09/897,790 and in U.S. patent application Ser. No. 09/815,157, referenced above.

Each subscriber device host 108 includes the appropriate hardware and software to perform Internet Protocol (IP) and Address Resolution Protocol (ARP), the purposes of which can be readily appreciated by one skilled in the art. The subscriber device host 108 can optionally include the appropriate hardware and software to perform transmission control protocol (TCP) and user datagram protocol (UDP). Furthermore, a subscriber device host 108 includes a driver to provide an interface between the subscriber device host 108 and the transceiver 110 in the subscriber device 102.

In addition to including a modem, the transceiver 110 includes the appropriate hardware and software to provide IP, ARP, admission control (AC), traffic control (TC), ad-hoc routing (AHR), logic link control (LLC) and MAC. The transceiver 110 further includes the appropriate hardware and software for IAP association (IA), UDP, simple network management protocol (SNMP), data link (DL) protocol and dynamic host configuration protocol (DHCP) relaying.

The Admission Control (AC) module acts on packets flowing between the IP stack module of the subscriber device host 108, the IP stack module of the subscriber device transceiver 110, and the traffic control (TC) module of the subscriber device transceiver 110. The IP stack of the transceiver 110 will communicate directly with the AC module. The TC module passes formatted-message (i.e., those messages having Ad-Hoc Routing (AHR) headers) to the Logical Link Control module (LLC). The AC module also provides a number of services to these interfacing modules, including determination and labeling of Quality of Service (QoS) requirements for IP packets, throttling of higher-layer protocols, support of the Mobility Manager (not shown), and generation of appropriate responses to client service requests such as DHCP, ARP, and other broadcast messages. The AC module will rely on local broadcasts, ad hoc routing updates, and unicast requests for information destined to the associated IAP 106 to provide these services transparently to the IP stacks.

The AC module will further provide a routing mechanism to forward packets to the appropriate IP stack in the host 108 or transceiver 110. Several of the services provided by the AC module will require knowledge of the IP packet header and, potentially, the UDP or TCP headers. Any other services which require knowledge of these packet headers should be isolated within the AC module to help enforce a modular, layered design. Information obtained from these headers that is required by TC or lower layers are encoded in the AHR header, or passed out-of-band with the packet.

It can be further noted that all IP packets intended for transmission by the transceiver 110 are forwarded to the AC module. The AC module should receive packets in buffers with sufficient headroom to prepend the AHR and LLC headers. Specifically, AC module receives a packet over the host interface. AC module must choose a buffer big enough to hold the packet from the host interface and the media access control header information which the transceiver places in front of the message. Headers are in front of the packet to ease implementation. Ad Hoc packets that have been received over the wireless interface must be delivered to the appropriate IP stack for reception. In doing so, the AC module strips any header information below the IP packet and forwards only the IP packet to the IP stack. The AC module should also be IP-aware in order to flow packets to the proper stack. The AC module is further capable of flowing packets between the attached IP stacks without sending the packets to lower layers, which enables host-to-transceiver communication without sending packets to the air. The AC module also operates to intercept DHCP client messages from the host and transceiver IP stacks, and reply with the IP address and parameters obtained from the DHCP server on the core LAN, because the DHCP protocol does not have any knowledge of the Ad Hoc Routing protocol.

Further details of the operations and protocols described above are set forth in a U.S. provisional patent application of Eric A. Whitehill entitled "Embedded Routing Algorithms Under the Internet Protocol Routing Layer in a Software Architecture Protocol Stack", Ser. No. 60/297,769, filed on Jun. 14, 2001, and in a U.S. patent application of Eric A. Whitehill entitled "Embedded Routing Algorithms Under the Internet Protocol Routing Layer in a Software Architecture Protocol Stack", Ser. No. 10/157,979, filed on May 31, 2002, the entire contents of both applications being incorporated herein by reference.

As further shown in FIG. 2, each IAP 106 includes an IAP host 112 and an IAP transceiver 114. The IAP host 112 includes the appropriate hardware and software to perform TCP, UDP, IP and ARP. Also, IAP host 112 includes the appropriate hardware and software to provide DHCP relaying, IA, a proxy ARP agent, and an NDIS driver. Furthermore, the IAP host 112 includes a driver to provide an interface between the IAP host 112 and the transceiver 114 in the IAP 106.

In addition to including a modem which can be similar to that in transceiver 110, the transceiver 114 includes the appropriate hardware and software to perform IP, ARP, AC, TC, AHR, LLC and MAC in a manner similar to that described above for the host 108 and transceiver 110. The transceiver 110 further includes the appropriate hardware and software for providing IA, UDP, SNMP, DL protocol and DHCP. Further details of the operations and protocols of IAP host 112 and transceiver 114 are discussed below and are set forth in U.S. provisional patent application Ser. No. 60/297,769 and in U.S. patent application Ser. No. 10/157,979, referenced above.

As discussed in the Background section above, if a subscriber device 102 in an ad-hoc wireless network 100 were to broadcast an ARP request to all the wireless nodes on the network 100, including subscriber devices 102 and IAPs 106, such a broadcast can overload the radio network. Hence, as will now be described with reference to FIGS. 2 and 3, to overcome this problem, when a subscriber device host 108 sends an ARP request, the subscriber device transceiver 110 intercepts the ARP request and forwards it directly to an IAP 106 for resolution instead of performing a traditional broadcast of the ARP request. Specifically, the subscriber device 102 unicasts the ARP request to the IAP 106 which is capable of resolving the ARP request over the reliable backbone of the fixed network 104. It is noted that although FIG. 2 shows a subscriber device 102 communicating directly with an IAP 106, the system architecture and ad-hoc capabilities of the wireless network allows the message to hop through intermediate nodes 102 between the subscriber device 102 and the IAP 106.

The IAP 106 resolves the query by looking first in its own ARP cache tables, or, if necessary, by querying other nodes on the wired fixed network 104. The IAP 106 then returns a message to the subscriber device 102 containing the MAC address corresponding to the requested IP address. Specifically, the IAP 106 unicasts a reply to the requesting subscriber device 102. It is noted that in an ad-hoc network such as network 100, transfer of a unicast message from the IAP 106 to the subscriber device 102 is much more reliable than the transfer of a broadcast message.

Furthermore, it should be noted that the ARP request can be for a MAC address of another subscriber device 102 in the-ad-hoc wireless network 100, which can be affiliated with the same IAP 106 as the requesting subscriber device 102 or with another IAP 106. For example, assuming that subscriber devices 102-5 and 102-7 shown in FIG. 1 are affiliated with IAP 106-1, if subscriber device 102-5 issues an ARP for the MAC address of subscriber device 102-7, IAP 106-1 can resolve this request and send to the subscriber device 102-5 a message containing the requested MAC address of subscriber device 102-7. Subscriber device 102-5 will therefore be capable of communicating directly with subscriber device 102-7 using that MAC address. On the other hand, if subscriber device 102-5 issues an ARP for the MAC address of a subscriber device (e.g., subscriber device 102-3) that is affiliated with a different IAP (e.g., IAP 106-2), IAP 106-1 can also resolve this request and send to the subscriber device 102-5 a message containing the requested MAC address of subscriber device 102-3. Subscriber device 102-5 will therefore be able to communicate with subscriber device 102-3 via IAP 106-1 using either the core network which is included in fixed network 104 shown in FIG. 1, or through other subscriber devices 102 in the ad-hoc wireless network 100 if the route is known.

In addition, if a subscriber device (e.g., subscriber device 102-5) issues an ARP for a MAC address of a device or machine on another network, such as a user terminal, server or the like, IAP 106-1 can also resolve this request and send to the subscriber device 102-5 a message containing the requested MAC address of that device or machine. Subscriber device 102-5 can thus communicate with that device or machine via IAP 106-1 and the core network, gateways and the like in fixed network 104 and in the other network with which that device or machine is affiliated.

Further details of these operations will now be described. FIG. 2 illustrates the transfer of information between components in the subscriber device host 108, subscriber device transceiver 110, IAP host 112 and IAP transceiver 114 to handle an ARP request generated at the subscriber device host 108. The numbers 1 through 12 in FIG. 2 correspond to steps 1 through 12 shown in the flowchart of FIG. 3.

As indicated in step 1 in the flowchart of FIG. 3 and by arrow 1 in FIG. 2, when the ARP module of the subscriber device host 108 generates an ARP request, the-admission control software-intercepts the ARP request. In step 2, the Admission Control (AC) module routes the ARP request to a specialized ARP module which, in this example, is referred to as an ANARP module.

As indicated in step 3, upon receiving the ARP request, the ANARP module checks the local list which compares ARPs to MACs. It is noted that the ANARP module ignores ARP requests for transceiver IP addresses and subscriber device IP addresses, because the ARP modules on the IP stacks of the subscriber device host 108 and subscriber device transceiver 110 answer those requests. That is, when such ARP requests are made, the ARP is passed directly between the IP stacks of the subscriber device host 108 and subscriber device transceiver 110, and normal ARP rules apply.

If the ANARP module does not identify a corresponding MAC address, the process proceeds to step 4 during which ANARP module sends a directed custom message to a specialized module, referred to in this example as an ANARP relay, in the IAP transceiver 114 via TC module and the modems. Specifically, the custom message is sent as an RF transmission from the modem in the subscriber device transceiver 110 to the modem in the IAP transceiver 114. As stated above, due to the capability of the wireless ad-hoc network, the subscriber device transceiver 110 need not send the custom message directly to the IAP transceiver 114. Rather, the subscriber device transceiver 110 can send the message to a transceiver of another node 102 in the network 110, which can operate as a router to send the message to the IAP 106 or, if necessary, to another node 102. That is, the message can hop through several nodes 102 before reaching the IAP 106. Further details of these ad-hoc capabilities are described in U.S. Pat. No. 5,943,322 to Mayor and in U.S. patent application Ser. Nos. 09/897,790 and 09/815,157, referenced above.

As indicted in step 5, the admission control (AC) module in the IAP transceiver 114 routes the relayed ARP request to a specialized module, referred to in this example as an ANARP module, in IAP host 112. In step 6, the ANARP module in IAP host 112 examines its local cache to determine whether a MAC address is present that corresponds to the IP address in the ARP request. If the ANARP module does not find an MAC entry that matches the IP address in the ARP request, the process proceeds to step 7. In step 7, the ANARP module in IAP host 11 converts the directed request to a UDP broadcast of a custom protocol to some or all of the elements on the network 104 to which the IAP 106 provides access.

As shown in step 8, upon receiving the UDP broadcast, an element on the network 104 responds to the ARP request by providing the MAC address to the ANARP in the IAP host 112, again via a custom UDP protocol. In step 9, the ANARP module in the IAP host 112 converts this response as appropriate. Specifically, the custom UDP message is decoded to determine the MAC address. The IAP 112 then updates its cache, and routes the MAC address to the ANARP relay in the IAP transceiver 114 via the Admission Control (AC) module. In step 10, the ANARP relay routes the ANARP response to the ANARP module in the subscriber device transceiver 110 via the modems in the IAP transceiver 114 and the subscriber device transceiver 110. Specifically, the modem in IAP transceiver 114 sends the MAC address response as a RF transmission to the modem in the subscriber device transceiver 110. As stated above, the IAP transceiver 114 need not communicate directly with the subscriber device transceiver 110. Rather, the message can be routed through one or more nodes 102 in the wireless ad-hoc network.

In step 11, the ANARP module in the subscriber device transceiver 110 sends an ARP response message including the MAC address to the Admission Control (AC) module. Then, in step 12, the admission control (AC) module delivers the ARP response message to the ARP module in the subscriber device host 108.

It can be further noted from the flowchart in FIG. 3 that if the ANARP module in the subscriber device transceiver 110 identifies an MAC corresponding to the IP address in its local list in step 3, the ARP is passed directly between the IP stacks of the subscriber device host 108 and subscriber device transceiver 110, and normal ARP rules apply. This condition can be considered an optimization technique, or rather, an exception handling technique, in which either the IP stack of the subscriber device host 108 or the IP stack of the subscriber device transceiver 110 issues an ARP request for itself or one another.

Also, if the ANARP module of the IAP host 112 in step 6 does indeed find an MAC entry that matches the IP address in the ARP request, the process proceeds to step 9 during which the ANARP module routes the response including the MAC address to the ANARP relay in the IAP transceiver 114 via the Admission Control (AC) module. The process then continues with steps 10 through 12 as discussed above.

As can be appreciated from the above, the ARP process performed in accordance with the embodiment of the present invention shown in FIGS. 2 and 3 avoids the use of a broadcast message from the subscriber device 102. Accordingly, the ARP request can be satisfied without resulting in undue congestion in the wireless ad-hoc network that would otherwise be caused by broadcasting the ARP to the wireless nodes in the ad-hoc network.

In the embodiment described above, the AC module redirects a broadcast ARP messages as a unicast message directed to an Intelligent Access Point (IAP) which is connected to a wireline backbone. This wireline backbone then resolves the ARP request in the normal manner. As discussed above, a significant advantage of this approach is the reduction of the unreliable broadcast transmission in ad-hoc CSMA/CA networks. In ad-hoc networks, broadcast messages can be either local (single transmission) or flooded (many transmissions ensuring all nodes at multiple hops receive the transmission). Algorithms for minimizing the flooding operation have been developed, but all suffer from the drawbacks associated with the need to forward messages in all directions to insure coverage.

In another embodiment, the transceiver 110 of a node 102 shown in FIG. 2 is capable of operating in at least two modes of operation. In the mode described above, the transceiver 110 operates in conjunction with a wireline backbone accessible via an IAP 106 which provides services such as Internet browsing and a PSTN gateway. The transceiver 110 is also capable of operating in a pure ad-hoc network mode which does not require wireline infrastructure of any kind. This mode, referred to as Mode 1 for purposes of the following description, is intended for small groups which desire to operate peer-peer applications amongst one another without need for external services. In-considering small groups, for example, a group of ten nodes 102, and depending on the network connectivity, either the local broadcast or the flooding broadcast described above might bring acceptable results. A local broadcast would be insufficient if the group of nodes 102 were dispersed beyond the range of a single transceiver such that multi-hop capability would be required for certain nodes 102 to communicate with certain other nodes 102. Alternatively, a broadcast flood would be sufficient if the network load was such that the reliability of the broadcast was high (e.g., greater than 90%). Unfortunately, the ability of the broadcast message to reach every node is compromised in a multi-hop multi-channel ad-hoc network with significant usage.

Larger networks in terms of nodes 102 and geographic area require a more intelligent and scalable solution for ARP resolution. An embodiment of the present invention provides this solution through the use of a distributed set of broadcast servers 107. These broadcast servers 107 are distributed across the peer-to-peer network 100 (see FIG. 1) such that a maximum number of hops from a node 102 to a server is maintained. These broadcast servers 107 operate similarly to an IAP 106 as discussed above. Nodes 102 whose host computer requires the physical address for a distant node 102 generate an ARP request in the standard method as discussed above. The AC module intercepts this request and retargets the broadcast as a unicast to its associated broadcast server.

The broadcast server 107 examines its ARP cache to determine whether it is aware of the proper mapping between IP address and MAC address. If the broadcast server 107 is unaware of the association, the broadcast server 107 sends a unicast request to each of the other broadcast servers 107 within the peer-peer network. Unlike the embodiment discussed above, the unicasts from the broadcast server 107 are directed over the wireless network since no wireline access is available or required. Broadcast servers 107 which receive the request examine their ARP caches to determine whether the entry in known. If the entry is known to a broadcast server, that broadcast server 107 directs a unicast reply back to the requesting broadcast server. Upon reception, the requesting broadcast server 107 copies the information into its ARP cache and creates an ARP reply for the requesting node 102.

To improve efficiency, broadcast servers 107 periodically advertise their ARP cache to the other broadcast servers 107. It is expected that this information is updated no more frequently than once about every 15 minutes, or at any other suitable time interval. Nomination of the broadcast server 107 is based upon an algorithm which prioritizes nodes 102 which are centrally located to improve efficiency. Additional criteria for the nomination include access to permanent power and user characteristics. Nomination of additional broadcast servers 107 is accomplished in a distributed fashion based on information located in the ad-hoc routing table. As the network expands in terms of hops or nodes, nomination of additional broadcast servers 107 is accomplished by way of the above criteria. Prior to creation of a second broadcast server, the node seeking to accomplish this function de-registers from the current broadcast server 107 and informs this server of the creation of the second server.

Algorithms for merging of disjoint networks are also provided thru information distributed within the ad-hoc routing algorithm. The routing algorithm contains information which identifies a node as a broadcast server 107. Broadcast servers 107 are merged whenever networks merge back to a more manageable size due to either a reduction in the geographic expanse or a reduction in the number of active nodes 102.

Further operations of the system and method described above, which provide a mechanism for trans-medium address resolution on a network with at least one highly disconnected medium having multiple access points to other media, will now be described. In the following discussion, "frame" and "packet" are used interchangeably. A frame typically refers to a piece of link data at layer 2, the MAC layer. A packet typically refers to a piece of routable data at layer 3, as with IP. As known to those skilled in the art, during communication, frames are transmitted and packets are routed. Therefore as the routing layer discussed below is between layer 2 and layer 3, either term may be correctly used.

When an incoming packet destined for a host machine on a particular LAN arrives at a gateway on the LAN which is, for example part of the fixed-network 104 shown in FIG. 1, the gateway requests that the ARP program find a physical host or MAC address that matches the IP address. The ARP program looks in the ARP cache at the gateway and, if it finds the MAC address, provides the MAC address so that the packet can be converted and formatted as appropriate and sent to the node. If no entry is found for the IP address in the ARP cache, the ARP program broadcasts a request packet in a special format to all the nodes on the LAN to see if any node recognizes that IP address as being associated with its MAC address. A node that recognizes the IP address as its own returns an affirmative reply to the ARP program. A node configured to respond to requests for IP addresses other than its own, for which it is said to proxy, returns an affirmative reply if it recognizes the IP address as one for which it is so configured. In response, the ARP program updates the ARP cache for future reference, and then sends the packet to the node having the MAC address associated with the IP address for which the packet is intended.

Cached address resolutions work well for wired-to-wired or wireless-to-wireless unicast communications, as it reduces the need to resolve every network packet individually. Network addresses are resolved to medium addresses once, then cached for future network packets. In a typical implementation, this cache may have an expiration timeout on the order of 20–120 minutes. Upon timeout, a given network address will be re-resolved to ensure reliable resolution for situations where network addresses of given nodes change periodically, such as the case with a DHCP-managed network.

As shown in FIG. 3, when a subscriber device (a wireless mobile node) 102 resolves network addresses of other devices on the wired medium, a medium address is determined that correlates to the node's associated IAP 106, which is presumed to be the best media bridge for the node to use. The best IAP 106 may be selected based on bandwidth, spectral efficiency, or other reasons specific to the network. However, given node mobility, the best IAP may not be static for a given mobile node. IAP associations may be formed and broken at a higher rate than the ARP expiration timeout would correct for. The MAC address for the IAP in the ARP cache therefore, may no longer reflect the best IAP, and depending upon ARP expiration timeout rates, the network could allow routing to less-appropriate IAP's.

The embodiment of the present invention shown in FIG. 3 modifies the address resolution protocol (ARP) to determine IP addresses which are subject to the dynamic link between mobile node and associated IAP. Once determined, the ARP resolves the wired network addresses of these IAP nodes to a particular well-known medium address, that is not used by any real node. The "unique" medium address associated with these IAP nodes may be referred to as a special type of "Cookie", which is easily identified by medium layer routing protocols. A medium frame addressed with this unique medium address is detected by the medium-layer routing protocols and routed to the node's currently associated IAP, at the moment the frame is sent. In doing so, the cached IAP MAC address is always current, regardless of changing links between mobile nodes and associated IAPs. The unique medium address assigned indicates an optimum IAP is subject to change, and medium-layer routing protocols should direct detection and route the frame to the currently associated IAP.

The modified ARP of FIG. 3 allows the network-layer ARP protocol to cache and use an entry that is always valid for a given network IAP MAC address so long as the network address does not, by way of DHCP or otherwise, migrate to the wireless medium, at least not more often than the ARP expiration timeout. The security issues mentioned which preclude a node from sending packets through a non-associated IAP, require one additional mechanism in the embodiment of the present invention. Since ad-hoc routed nodes may route through other nodes to reach an IAP, and intermediate routing nodes may be associated to different IAP's, the well-known address is not sufficient for actual frame addressing in the ad-hoc routing medium. An intermediate node would choose to route this type of addressed frame to its own associated IAP instead of the associated IAP of the frame's source. To prevent this, the medium layer routing protocols replace any such well-known address sent from the network layer with the actual medium address of the associated IAP, just as the frames are sent. This ensures proper delivery, even if intermediate nodes are associated to different IAP's.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A node, for use in a wireless ad-hoc communications network, and being adapted to transmit and receive data packets to and from other nodes in said wireless ad-hoc network and to operate as a router to route other data packets destined for said other nodes in said wireless ad-hoc network to said other nodes, said node comprising:

an address resolution protocol module, adapted to generate an address resolution protocol (ARP) request for a media access control (MAC) address corresponding to an Internet protocol (IP) address, said MAC address being associated with a device; and a transceiver, adapted to transmit said ARP request for delivery to a broadcast server of said wireless ad-hoc network without broadcasting said ARP request to a plurality of said other nodes in said wireless ad-hoc network; and wherein said transceiver is adapted to unicast said ARP request for unicast delivery to said broadcast server.

2. A node as claimed in claim 1, wherein:
said transceiver is adapted to transmit said ARP request to another said node in said wireless ad-hoc network for delivery to said broadcast server.

3. A node as claimed in claim 1, further comprising:
a host device, adapted to generate said data packets for transmission by said transceiver to at least one of said other nodes in said network, said address resolution protocol module being disposed in said host device.

4. A node as claimed in claim 3, wherein:
said host device comprises a device adapted to receive and output multimedia data.

5. A method for controlling a node in a wireless ad-hoc communications network to perform address resolution protocol (ARP), said node being adapted to transmit and receive data packets to and from other nodes in said wireless ad-hoc network and to operate as a router to route other data packets destined for said other nodes in said wireless ad-hoc network to said other nodes, said method comprising:
controlling said node to generate an address resolution protocol (ARP) request for a media access control (MAC) address corresponding to an Internet protocol (IP) address, said MAC address being associated with a device; and
controlling said node to transmit said ARP request for delivery to a broadcast server of a network portion without broadcasting said ARP request to a plurality of said other nodes in said wireless ad-hoc network; and wherein:
said second controlling step controls said node to unicast said ARP request for unicast delivery to said broadcast server.

6. A method as claimed in claim 5, wherein:
said transmission controlling controls said node to transmit said ARP request to another said node in said wireless ad-hoc network for delivery to said broadcast server.

7. A method as claimed in claim 5, wherein:
said node comprises a host device, adapted to generate said data packets for transmission by said node to at least one of said other nodes in said network; and
said ARP generating controls said host device to generate said ARP request.

8. A method as claimed in claim 7, further comprising:
controlling said host device to receive and output multimedia data.

9. A computer-readable medium of instructions for controlling a node in a wireless ad-hoc communications network to perform address resolution protocol (ARP), said node being adapted to transmit and receive data packets to and from other nodes in said wireless ad-hoc network and to operate as a router to route other data packets destined for said other nodes in said wireless ad-hoc network to said other nodes, said computer-readable medium of instructions comprising:
a first set of instructions, adapted to control said node to generate an address resolution protocol (ARP) request for a media access control (MAC) address corresponding to an Internet protocol (IP) address, said MAC address being associated with a device; and
a second set of instructions, adapted to control said node to transmit said ARP request for delivery to a broadcast server of a network portion without broadcasting said ARP request to a plurality of said other nodes in said wireless ad-hoc network; and wherein:
said second set of instructions is adapted to control said node to unicast said ARP request for unicast delivery to said broadcast server.

10. A computer-readable medium of instructions as claimed in claim 9, wherein:
said second set of instructions is adapted to control said node to transmit said ARP request to another said node in said wireless ad-hoc network for delivery to said broadcast server.

11. A computer-readable medium of instructions as claimed in claim 9, wherein:
said node comprises a host device, adapted to generate said data packets for transmission by said node to at least one of said other nodes in said network; and
said first set of instructions is adapted to control said host device to generate said ARP request.

12. A computer-readable medium of instructions as claimed in claim 11, further comprising:
a third set of instructions, adapted to control said host device to receive and output multimedia data.

13. A wireless ad-hoc communications network, comprising:
at least one node, adapted to transmit and receive data packets to and from other nodes in said wireless ad-hoc network, and to operate as a router to route other data packets destined for said other nodes in said wireless ad-hoc network to said other nodes; and
a broadcast server, adapted to enable said node to communicate with other said nodes in said wireless ad-hoc network;
said node being further adapted to generate an address resolution protocol (ARP) request for a media access control (MAC) address corresponding to an Internet protocol (IP) address, said MAC address being associated with a device, and to transmit said ARP request for delivery to said broadcast server without broadcasting said ARP request to a plurality of said other nodes in said wireless ad-hoc network; and wherein:
said node is adapted to unicast said ARP request for unicast delivery to said broadcast server.

14. A wireless ad-hoc communications network as claimed in claim 13, wherein:
said node is further adapted to transmit said ARP request to another said node in said wireless ad-hoc network for delivery to said broadcast server.

15. A wireless ad-hoc communications network as claimed in claim 13, wherein said node further comprises:
a host device, adapted to generate said data packets for transmission by said node to at least one of said other nodes in said network, and to generate said ARP request.

16. A wireless ad-hoc communications network as claimed in claim 15, wherein:
said host device comprises a device adapted to receive and output multimedia data.

17. A method for operating a wireless ad-hoc communications network, comprising:
providing at least one node, adapted to transmit and receive data packets to and from other nodes in said wireless ad-hoc network, and to operate as a router to route other data packets destined for said other nodes in said wireless ad-hoc network to said other nodes;

providing a broadcast server, adapted to enable said node to communicate with other said nodes in said wireless ad-hoc network; and controlling said node to generate an address resolution protocol (ARP) request for a media access control (MAC) address corresponding to an Internet protocol (IP) address, said MAC address being associated with a device, and to transmit said ARP request for delivery to said broadcast server without broadcasting said ARP request to a plurality of said other nodes in said wireless ad-hoc network; and wherein:

said controlling step controls said node to unicast said ARP request for unicast delivery to said broadcast server.

18. A method for operating a wireless ad-hoc communications network as claimed in claim 17, wherein:

said controlling controls said node to transmit said ARP request to another said node in said wireless ad-hoc network for delivery to said broadcast server.

19. A method for operating a wireless ad-hoc communications network as claimed in claim 17, further comprising:

controlling a host device of said node to generate said data packets for transmission by said node to at least one of said other nodes in said network, and to generate said ARP request.

20. A method for operating a wireless ad-hoc communications network as claimed in claim 19, wherein:

said host device comprises a device adapted to receive and output multimedia data.

* * * * *